J. H. HAIR.
Animal-Traps.

No. 140,036. Patented June 17, 1873.

ATTEST:
Jas. L. Ewin
Walter Allen

INVENTOR:
Joseph H. Hair
By Knight Bros.
Attys.

UNITED STATES PATENT OFFICE.

JOSEPH H. HAIR, OF GALESBURG, ILLINOIS.

IMPROVEMENT IN ANIMAL-TRAPS.

Specification forming part of Letters Patent No. 140,036, dated June 17, 1873; application filed April 23, 1873.

*To all whom it may concern:*

Be it known that I, JOSEPH H. HAIR, of Galesburg, in the county of Knox, and State of Illinois, have invented a certain Improved Animal-Trap, of which the following is a specification:

My invention consists partly in the use of a vertically-sliding gate that is supported on a bell-crank lever, which is operated either by the bait-lever or by a pivoted platform, (which the animal depresses in attempting to reach the bait, which may be placed on a fixed pin beyond the platform, or on the free end of the bait-lever, or both). The movement of the bait-lever or the platform disengages the said bell-crank lever from the drop-gate, which, as it drops partially or wholly, closes the entrance to the trap. My invention also consists in the arrangement of a swinging gate inside the trap, the said gate being connected to the sliding gate by chain, bell-crank lever, and connecting link, so that as a rat or other animal passes beneath the gate into the inner chamber of the trap, the upward swinging of the gate will (through chain-lever and link connections) lift the fallen gate to its open position.

Figure 1:
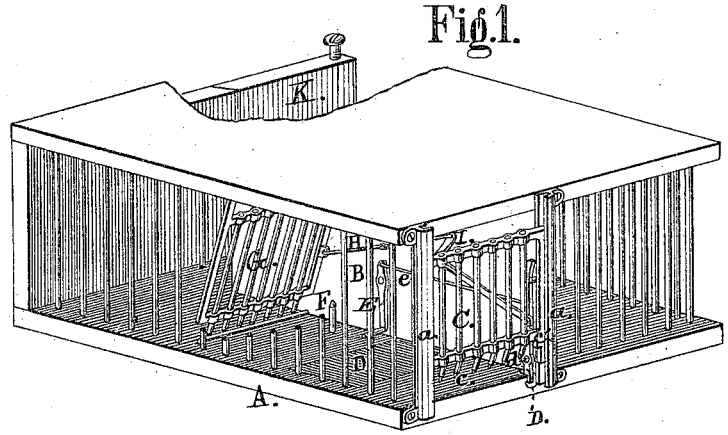
Figure 2:
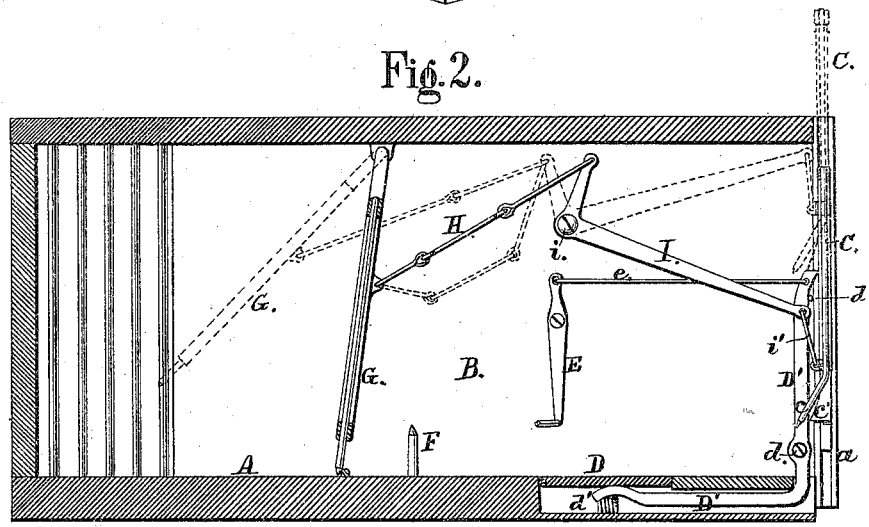

Figure 1 is a perspective view of the trap, showing the sliding (or drop-gate) closed, and ready to be again set or opened by the rat passing under the swinging gate. Fig. 2 is a sectional elevation, showing the swinging and sliding gates, closed in full lines, and opened in dotted lines.

A is the trap-body, divided into two compartments by a partition B. C is a sliding or drop-gate arranged in slides $a$, secured in a vertical position to the body A of the trap. This gate is formed of wires C whose lower ends $c$ are pointed and inclined inward, as indicated in Figs. 1 and 2. D is a depressible platform, pivoted in a recess in the bottom of the trap. D' is a bell-crank lever pivoted at $d$ to the partition, on one end of which rests the depressible platform D, the other end of this lever engaging the lug or projection $c'$ of the gate C, so as to support the same when open. $d'$ is a spring arranged under the lever D', the purpose of which is to force the upper end of the lever D' outward, into engagement with the lug $c$ of the gate C, and the spring also supports the platform D. $d''$ is a pin, limiting the forward movement of the upper end of the lever D. E is a bait-lever pivoted to the partition B, connected by rod $e$ with lever D', so that, as the rat pulls at the bait upon the lever E, the movement will disengage the lever D' from the gate and allow it to fall. F is a bait-pin, so arranged that the rat will have to pass partly over the depressible platform before it reaches the bait on said pin. G is a swinging gate pivoted to the top of the trap, and which is connected to the gate C by chain H, bell-crank lever I, (pivoted at $i$ to the partition B) and link $i'$.

In operation the rat or other animal passes under the gate C, and either treads on the depressible platform, or draws back the lower end of the lever E, in endeavoring to secure the bait thereon. The described movement of either D or E will disengage the lever D' from the lug $c$, and allow the gate C to drop either to the rear of the rat or upon its back, and the inwardly projecting points $c$, will prevent the retrograde movement of the rat, which will be compelled to move forward and pass under the gate G, which is thus swung inward, and by means of the chain H, lever I and link $i'$ will lift the gate C to its open position (as indicated in dotted lines in Fig. 2.) The rat then passes into the inner compartment of the trap. K is a door for removal of the rats from the trap.

I claim as my invention—

1. The sliding gate C, when provided with inwardly-inclined points $c$, substantially as and for the purpose set forth.

2. The combination of the gate C with lug $c'$, platform D, bait pin or hook F, and lever D' with spring $d'$, substantially as set forth.

3. The combination and arrangement of the gate C, bait-lever E, rod $e$, and spring lever D' $d'$, substantially as set forth.

4. The sliding gate C, platform D, spring lever D' $d'$, bait-pin F, swinging gate G, chain H, lever I, and link $i'$, all combined and arranged substantially as and for the purpose set forth.

5. The sliding gate C, bait-lever E, connecting rod $e$, lever D $d'$, gate G, chain H, lever I, and link $i'$ combined and arranged, substantially as, and for the purpose set forth.

JOSEPH H. HAIR.

Witnesses:
E. P. BRECKENRIDGE,
M. K. HAMBLIN.